UNITED STATES PATENT OFFICE 2,579,745

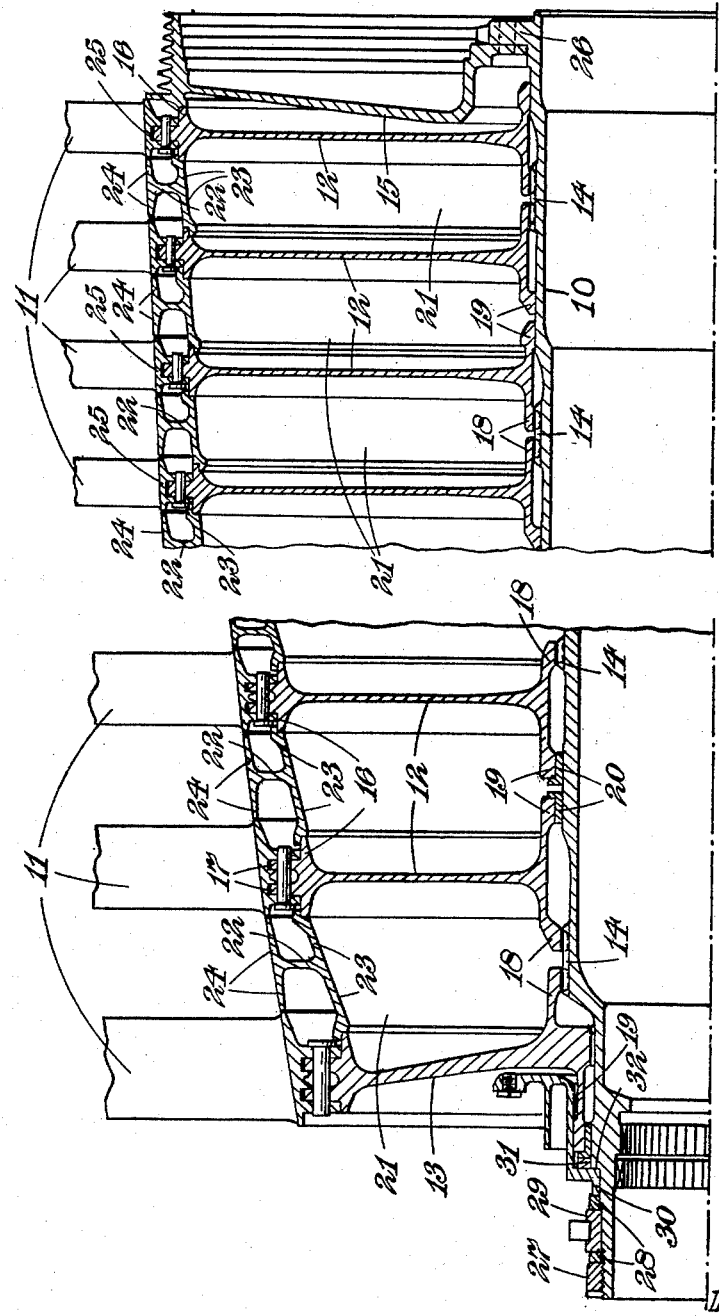

AXIAL-FLOW COMPRESSOR OR TURBINE

Adrian Albert Lombard, Allestree, Kenneth Ivor Clifford Vincent, Alvaston, and Frederick William Walton Morley, Aston-on-Trent, England, assignors to Rolls-Royce Limited, Derby, England, a British company Application February 10, 1948, Serial No. 7,487
In Great Britain February 17, 1947

5 Claims. (Cl. 230—134)

This invention relates to axial compressors and turbines, and has for its object to provide a blade-supporting disc and rotor construction, which is light in weight, and is therefore of especial advantage for use in gas-turbine engines for aircraft propulsion, where considerations of weight are of major importance.

According to the present invention, there is provided a rotor for a multi-stage axial-flow compressor or turbine comprising a central shaft, rotor blading, and a plurality of axially-spaced discs carrying the rotor blading peripherally thereof, wherein each of a number of said discs has at its center and integral therewith a pair of oppositely-directed axial cylindrical extensions, said extensions surrounding the shaft and being of such dimensions that they are radially deformable along their length to permit expansion of the associated disc relative to the shaft under centrifugal loads whilst leaving the free ends of the extensions substantially undeformed by such centrifugal loading, one of said extensions engaging by its free end on the shaft to support and to maintain alignment of the disc on the shaft, and the other of said extensions being engaged by its free end torsionally with the shaft.

It will be appreciated that the blade-supporting disc being loaded peripherally by the blades is subjected to centrifugal loading tending to expand the disc or wheel at its engagement with the shaft, the radial expansion of which under centrifugal loads is less than that of the disc; the invention provides for maintenance of alignment of the disc at a transverse plane remote from that of the disc, whilst permitting centrifugal deformation thereof. The arrangement of this invention also enables the discs to be made of a relatively thin material without the possibility of the discs becoming misaligned with respect to the shaft on which they are mounted.

According to a further feature of this invention a ring of steel or the like material is shrunk on or into the free end of each of a number of the extensions to provide additional strength at the points of engagement of the extensions with the shaft, thereby assisting to ensure maintenance of engagement between the free ends of the extensions and the shaft under centrifugal loads and when the discs and their extensions are formed from a material, such as a light metal alloy, having a coefficient of thermal expansion greater than that of steel. In a multi-stage axial compressor for example, the shaft may be formed from steel and some at least of the discs may be formed from such a high expansion material so that relative thermal expansion of the discs and shaft will tend to slacken the discs on the shaft, and according to a feature of this invention therefore the associated extensions of said discs have a ring of steel shrunk onto or into its free end to provide additional strength at the free ends and to maintain the free ends in engagement with the shaft.

There will now be described by way of example of this invention, one construction of rotor for an axial multi-stage compressor, the description referring to the accompanying drawings in which:

Figure 1A illustrates an axial section through a portion of the rotor, and

Figure 1B is a continuation to the right of Figure 1A, with a central portion of the assembly omitted.

The rotor comprises a central hollow steel shaft 10 and a number of stages of compressor blading 11 supported in a suitable manner at the peripheries of the rotor drum. All stages of blading with the exception of the first stage are mounted on the peripheries of discs 12 of relatively thin cross-section and the first stage being carried on the periphery of an end-plate 13 which is rigid compared with discs 12. An end plate 15 is provided at the outlet end of the rotor.

The shaft 10 is of stepped form increasing in diameter through the stages from the inlet end to the outlet end, and is provided externally with splined formations 14 through which the discs 12 are torsionally engaged with the shaft in the manner described below.

The discs 12 are of plane form, are relatively thin in cross-section in that they have insufficient strength individually in flexure to accommodate gyroscopic and other forces arising in running and have flanged peripheries 16 with radial webs 17 to which the blades 11 are attached. The discs are also formed at their centres with a pair of oppositely-directed axial cylindrical extensions 18, 19 surrounding the shaft 10. The extensions 18 are formed with internal splines to co-operate with the splines 14 on the shaft to engage the discs torsionally with the shaft. In operation of the compressor the extensions 18 are deformed radially along their length but their free ends on which the internal splines, which engage with the splines 14, are formed, are thickened (as will be seen from the drawings) so as to be substantially undeformed thereby to maintain the splined engagement.

The extensions 19 engage by their free ends (that is the ends remote from the associated discs) on plain portions on the shaft 10. The free ends are thickened with respect to the thin-walled portions thereof extending between the free ends and the discs and the length of these extensions and their other dimensions are such that extension 19 is radially deformable along its length to permit expansion of the discs relative to the shaft under centrifugal loads and that the free end remains in contact with the shaft so as to maintain the alignment of the discs on the shaft.

In this construction the discs 12 and associated extensions 19 of the initial compression stages are formed from a light metal alloy having a co-efficient of thermal expansion greater than that of steel, and in order to ensure, by prestressing the free-ends of the extensions 19, that relative thermal expansion of the free-end and shaft shall not occur, steel rings 20 are shrunk onto or into the extensions. In this way alignment of the light alloy discs is maintained.

The discs 12 of the later stages are formed from steel and the free ends of their extensions 19 bear directly on the shaft.

It will be appreciated that since the discs 12 have a relatively thin cross-section, the centrifugal loading on the discs 12 and blades 11 at the high rotational speeds experienced in operation causes radial expansion of the discs thus increasing the diameter of the central bore of the discs and also that this expansion is greater than that of the hollow shaft. The discs would thus be capable of moving out from alignment with the shaft. However, the expansion of the discs is accommodated by coning of the extensions 19 by deformation of the thin walled portion and this deformation relieves the free ends from heavy centrifugal loads whereby they are able to maintain the alignment of the discs on the shaft.

The discs 12 are in axially-spaced relation on the shaft 10 and are free for axial movement on the shaft.

The discs 12 inter-abut adjacent their peripheries indirectly through spacer rings 21 which are of a substantially H-section and are positioned with their central webs 22 substantially radially of the compressor rotor axis, with their inner flanges 23 in spigoted engagement with flanged peripheries 16 of the discs 12, and with their outer flanges 24 in alignment with the outer surfaces of the root-platforms 25 of the blades 11 to provide a smooth continuous outer surface to the drum assembly. It will be seen that in the initial compressor stages, the flanges 23 spigot around the flanged peripheries 16 and that in the later stages alternate flanges 23 spigot around and within alternate flanged disc peripheries. A similar spacer ring 21 is provided between the end-plate 13 and the first disc 12. The end-plate 15 however abuts by its periphery directly on to the last disc 12.

The end-plates 13, 15 are rigid as compared with the discs 12 and are of dished form being positioned with their convex surfaces towards the discs 12. The dishing of the end-plates permits an axial load to be applied to the discs 12 in the manner described below. Moreover, centrifugal loading of the end-plates tends to tighten them on discs making the drum construction more rigid.

The end-plate 15 abuts against a shoulder 26 formed by a flange on the shaft and provides an abutment at its periphery to permit the discs 12 to be nipped axially by a load applied by displacing the end-plate 13 axially of the shaft in assembly of the rotor.

In order that the axial load may be applied to the disc assembly at its periphery through the end plate 13, which is engaged on the shaft in a like manner to the discs 12, a ring nut 27 is threaded on the shaft 10 and is arranged to apply an axial load onto the extension 19 of the end-plate 13 through washers 28, race 29 for the front shaft bearing, stepped sleeve 30 and a further washer 31 located between the sleeve 30 and the end-plate 13. In order that an excessive nip shall not be applied to the disc assembly, a shoulder 32 is formed on the shaft and the disc assembly is arranged to terminate close to the shoulder 32 but not to overhang it. The washer 31 is then selected to have an axial thickness equal to the distance between the shoulder 32 and the end of the assembly (represented by the free end of the extension 19 of end-plate 13) plus a predetermined amount dependent on the desired degree of nip. The nut 27 is then tightened until the stepped sleeve 30 abuts against the shoulder 32. Tightening action thus puts the shaft into tension and loads the discs axially at their peripheries.

In this manner a rotor drum is obtained which is of relatively light construction but which is capable of withstanding gyroscopic loads experienced in operation, such as might arise from aircraft manoeuvring, and having a high whirling speed outside the normal running range of the compressor. The gyroscopic loads tend to tilt the discs and thus to open up the disc assembly at one side and close it at the other; this tendency is restrained by the tension in the shaft and axial peripheral load on the discs so that the degree of nip will be adjusted to load the discs to an extent greater than gyroscopic loads which will be experienced in use.

The spigoting of the spacers on the discs assists in the transmission of torsional loads through the wall of the rotor since expansion of the discs due to centrifugal loads increase the frictional effect between the discs and spacers. Relative rotation of the discs and spacers is thus avoided.

We claim:

1. A rotor for a multi-stage axial-flow compressor or turbine comprising a central shaft, rotor blading, and a plurality of axially-spaced discs carrying the rotor blading peripherally thereof, a pair of oppositely directed axial cylindrical extensions on each of a number of said discs at the center thereof and integral therewith, said extensions surrounding the shaft, each of said extensions having a radially reduced portion radially deformable along its length to permit expansion of the associated disc relative to the shaft under centrifugal loads, and a radially enlarged free end portion capable of substantially resisting radial deformation by such centrifugal loading, the free end of one of the extensions engaging the shaft to support and to maintain alignment of the disc on the shaft, and the free end of the other of said extensions torsionally and slidably engaging the shaft for free axial movement on the shaft.

2. A rotor as claimed in claim 1, wherein a ring of a material having a coefficient of thermal expansion less than that of the material of the associated disc is shrunk on to the free end of each of a number of the extensions to provide additional strength at the points of engagement of the extensions with the shaft.

3. A rotor as claimed in claim 1, for an axial compressor wherein the shaft is formed from steel and some at least of the blade-carrying discs are formed from a material having a greater thermal expansion than the shaft and wherein each of a number of the extensions of said discs has a ring of steel shrunk onto its free end to provide additional strength at its free end and to maintain its free end in engagement with the shaft.

4. A rotor for a multi-stage axial-flow compressor or turbine comprising a central shaft, rotor blading, and a plurality of axially-spaced discs carrying the rotor blading peripherally thereof, a pair of oppositely directed axial cylindrical extensions on each of a number of said discs at the center thereof and integral therewith, said extensions surrounding the shaft, each of said extensions having a radially reduced portion radially deformable along its length to permit expansion of the associated disc relative to the shaft under centrifugal loads, and a radially enlarged free end portion capable of substantially resisting radial deformation by such centrifugal loading, the free end of one of the extensions engaging the shaft to support and to maintain alignment of the disc on the shaft, and the free end of the other of said extensions torsionally engaging the shaft, the free ends of both said extensions slidably engaging the shaft for free axial movement on the shaft.

5. A rotor for a multi-stage axial-flow compressor or turbine comprising a central shaft, rotor blading, and a plurality of axially-spaced discs carrying the rotor blading peripherally thereof, a pair of oppositely directed axial cylindrical extensions on each of a number of said discs at the center thereof and integral therewith, said extensions surrounding the shaft, each of said extensions having a radially reduced portion radially deformable along its length to permit expansion of the associated disc relative to the shaft under centrifugal loads, and a radially enlarged free end portion capable of substantially resisting radial deformation by such centrifugal loading, the free end of one of the extensions engaging the shaft for free axial movement on the shaft and free rotative movement relative to the shaft to support and to maintain alignment of the disc on the shaft, and the free end of the other of said extensions torsionally and slidably engaging the shaft for free axial movement on the shaft.

ADRIAN ALBERT LOMBARD.
KENNETH IVOR CLIFFORD VINCENT.
FREDERICK WILLIAM WALTON MORLEY.

REFERENCES CITED

The following references are of record in the file of this patent:

UNITED STATES PATENTS

| Number | Name | Date |
|---|---|---|
| 1,243,476 | Anderson | Oct. 16, 1917 |
| 1,873,956 | Dahlstrand | Aug. 30, 1932 |
| 2,441,432 | McGee | May 11, 1948 |
| 2,452,782 | McLeod et al. | Nov. 2, 1948 |

FOREIGN PATENTS

| Number | Country | Date |
|---|---|---|
| 120,669 | Austria | Jan. 10, 1931 |
| 219,655 | Great Britain | Oct. 9, 1924 |